Figure 1:
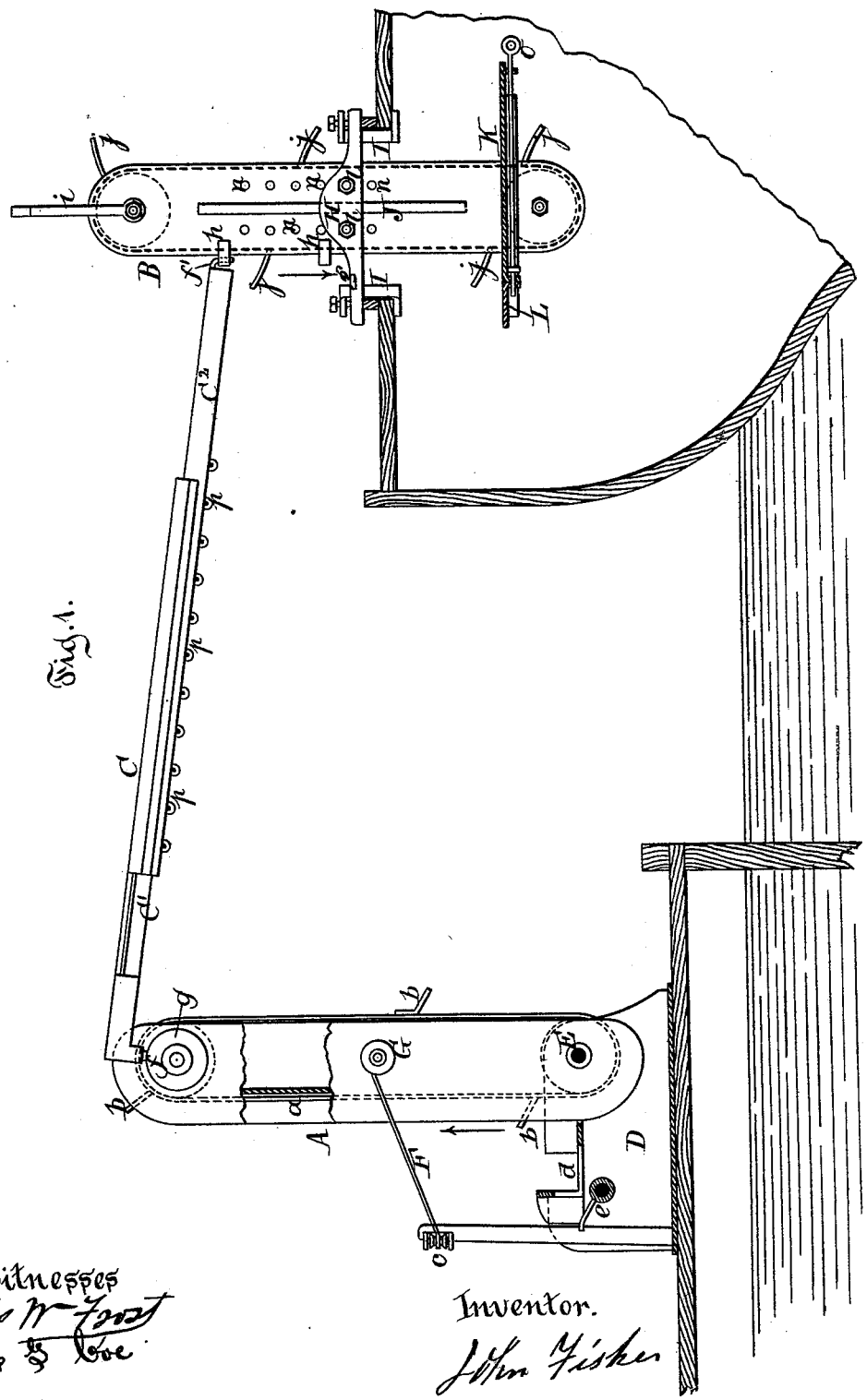

(No Model.) 3 Sheets—Sheet 1.

J. FISHER.
Hoisting and Loading Apparatus.

No. 229,528. Patented July 6, 1880.

Witnesses
Louis W. Frost
Charles F. Love

Inventor.
John Fisher (No Model.) 3 Sheets—Sheet 2.
J. FISHER.
Hoisting and Loading Apparatus.
No. 229,528. Patented July 6, 1880.
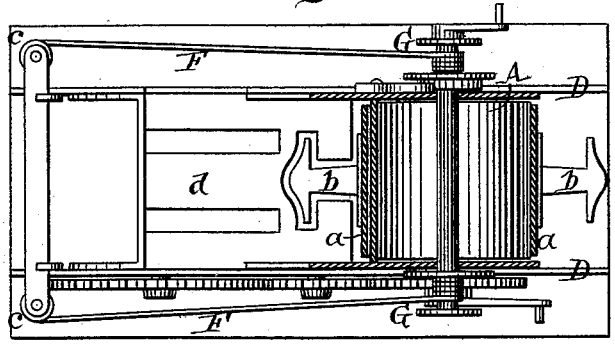
Fig. 2.
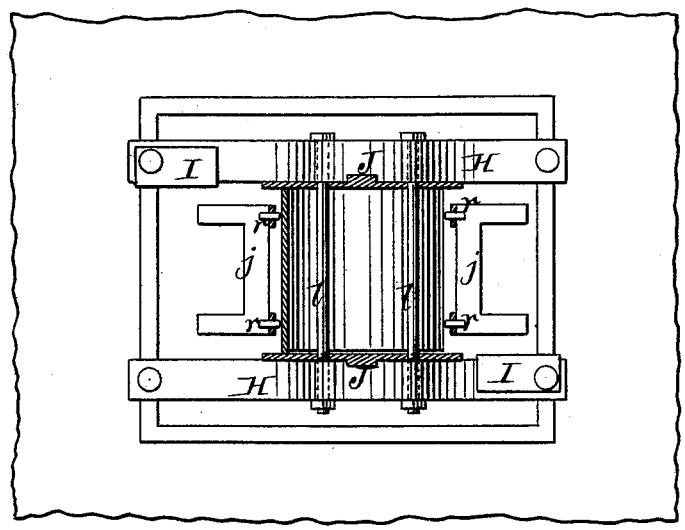
Fig. 3.
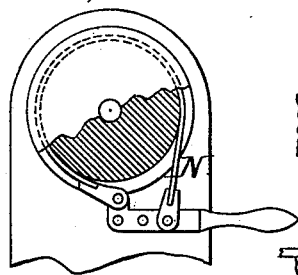
Fig. 7.
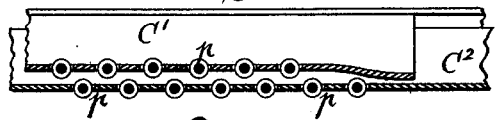
Fig. 4.
Fig. 4*.
Witnesses.
Louis W. Frost
Charles L. Box
Inventor.
John Fisher (No Model.) 3 Sheets—Sheet 3.
J. FISHER.
Hoisting and Loading Apparatus.
No. 229,528. Patented July 6, 1880.
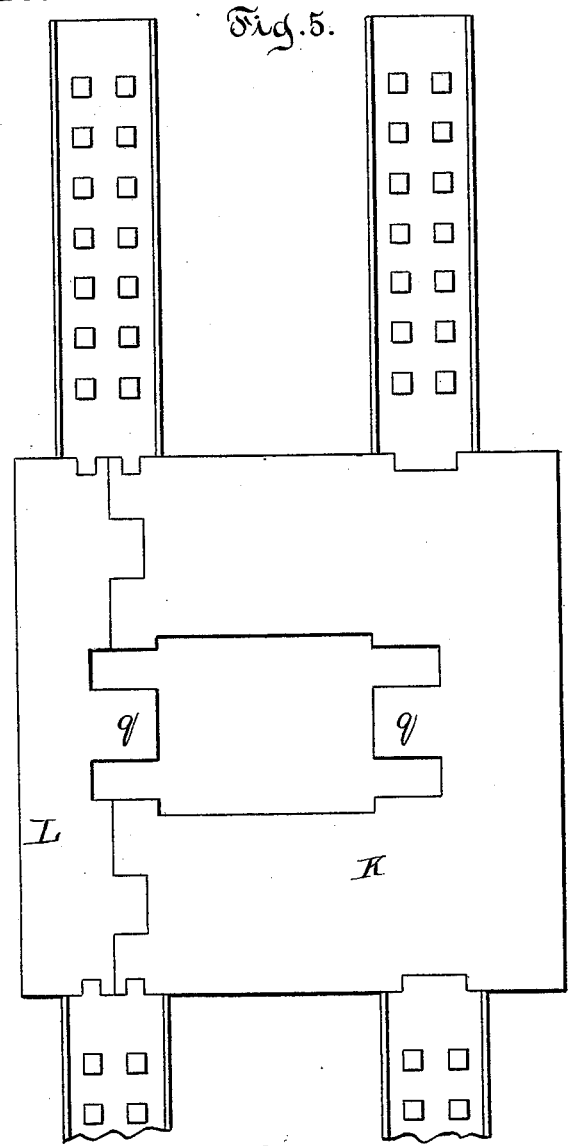
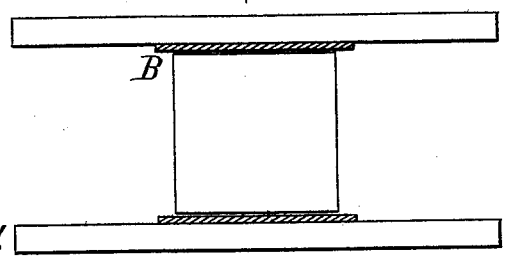
Witnesses.
Inventor.

UNITED STATES PATENT OFFICE.

JOHN FISHER, OF NEW YORK, N. Y.

HOISTING AND LOADING APPARATUS.

SPECIFICATION forming part of Letters Patent No. 229,528, dated July 6, 1880.

Application filed March 20, 1880. (No model.)

*To all whom it may concern:*

Be it known that I, JOHN FISHER, of the city, county, and State of New York, have invented a new and useful Improvement in Hoisting and Loading Apparatus for Vessels, and I do hereby declare that the following, taken in connection with the accompanying drawings, is a full, clear, and accurate description of the same.
The object of my invention is to provide a hoisting and loading apparatus that can be used for loading vessels in all kinds of weather and can be operated with less labor than is now required in the work.
It consists, first, of a device for carrying the freight to the deck of the vessel, composed of an endless belt or chain running over drums and provided with hooks or fingers, on which the freight is placed, and which carry it from the wharf, over adjustable slides or chutes, to the deck of the vessel, and deposit it in a position to be let down into the hold.

It consists, second, in an apparatus adjustable in length for letting the freight down from the deck into the hold, composed of an endless belt or chain provided with hooks or fingers, on which the freight is placed to lower it to a platform from which it is transferred to its place in the hold.
In the drawings, Figure 1 represents the entire apparatus, partly in side view and partly in section. Fig. 2 is a horizontal section of the hoisting device. Fig. 3 is a like section of the loading apparatus. Figs. 4 and 4× are detail views of the chute. Fig. 5 is a plan view of the loading-platform. Fig. 6 is a section of the loading apparatus, showing the cleats for supporting the platform. Fig. 7 shows the brake of the loading apparatus.
Referring to the drawings, A represents the hoisting device, which is pivoted at E on the standards D, fixed to the wharf, lighter, or scow from which the vessel is to be loaded. The hoisting apparatus A has two drums, an upper and lower one, which have an endless band or chain, $a$, passing over them. This band or chain $a$ is provided with hooks or fingers $b$, on which the freight is placed, and as the drums are revolved they carry the freight from the wharf up to the desired point. $d$ is a platform, on which the freight to be taken up by the fingers $b$ is placed. The pusher $e$ is used to transfer the freight from the platform $d$ to the fingers $b$, or it may be dispensed with.

The hoisting apparatus A turns on pivot E of the lower drum, and in this way the upper drum can be raised or lowered, to accommodate it to different heights of vessels, or as they sink in the water under the weight of the freight. The said hoisting apparatus is adjusted at any desired height by means of the tackle F, running on the reels G and over the wheels $c$, fastened to a post or some convenient place on the wharf or scow. I prefer a tackle, as shown, as a means of adjusting the hoisting apparatus to the height desired, though any other suitable means can be used.

Secured to the outside attachment, $g$, of the upper drum of the hoisting apparatus, by means of the pin $f$, and working on the center of said drum, is the chute or slide C, consisting of two pieces, $C'$ $C^2$, made of planking or other suitable material, and so arranged that the said two pieces $C'$ $C^2$ will telescope one within the other, and thus adjust themselves to the rising and falling of the tide and the raising or lowering of the hoisting device and loading apparatus.

The chute C may be provided, if desired, with the wheels $p$.

The chute C is secured to the blocks $h$ $h$ on the loading apparatus B by means of the pin $f'$.

The loading apparatus B consists of two drums, over which passes an endless belt or chain, $r$, secured to which are hooks or fingers $j$. This apparatus is secured to the hatchway of the vessel by means of the side bars, H, held by the clamps I to the hatch.

The apparatus B is adjustable in its length by means of the projections or slides J, secured to the frames of the apparatus B, and which slides run in grooves formed in the side bars, H, and are secured at any desired height by means of the bolts $l$ $l$, which pass through holes $n$ of the frames.

To the lower end of the frames is fixed a platform, formed in two sections, K and L, which are secured together by bolt O. This platform has an opening, through which the frames of the apparatus B pass, and is provided with projecting pieces q, forming tables, one at either end, which fit between the hooks or fingers j, as they move with the endless belt or chain passing over the drums. (See Fig. 5.)

N is a brake placed adjacent to the surface of the upper drum of the loading apparatus B, and connected with a lever for the purpose of controlling or stopping the endless belt or chain passing over the drums.

i is a rod attached to the apparatus, to which tackle may be fixed for the purpose of raising or lowering it.

The operation of my invention is as follows: The endless belt or chain a of the hoisting device A is operated by means of a crank, horse, or engine, or other suitable power, and as it revolves the freight-packages are put on the hooks or fingers b, one at a time, and pass thence over the chute C to the hooks or fingers j on belt or chain passing over the drums of the loading apparatus B, and by their own gravity descend into the hold of the vessel, the operator regulating the speed and force with which they descend by means of the brake; and when the table of the platform is reached the packages are deposited on the table, whence they are removed by the laborers, and stored away in the hold, while the fingers pass down through the opening between the table and platform, and so on around, the freight placed on the fingers keeping the belt or chain moving continuously. As the freight accumulates in the hold and space is required, the frames of the apparatus B are moved up and adjusted at the desired height, and this shortening up of the apparatus is continued until the deck is reached, if necessary.

For transferring freight from the hold of the vessel to the wharf or pier the hoisting device is dispensed with, and the freight is elevated, by means of the loading apparatus worked by any suitable power, to the deck, whence it is passed down the chute or slide to the wharf or pier.

Having thus described my invention, what I claim, and desire to secure by Letters Patent, is—

1. The loading apparatus B, formed of drums, over which passes an endless belt or chain provided with fingers for the reception of freight, the said apparatus B being secured to the hatchway of the vessel by the side bars, H, and being vertically adjustable by means of the slides J and bolts l l, substantially as described.

2. The combination of the hoisting device A with the loading apparatus B, brake N, and the chute or slide C, formed of the adjustable pieces C' and C².

3. In combination with the loading apparatus B, the platform K L, provided with the tables or projecting pieces q, substantially as described.

In testimony whereof I have hereunto set my hand this 8th day of March, 1880.

JOHN FISHER.

In presence of—
LOUIS W. FROST,
CHARLES G. COE.